Dec. 30, 1969     R. M. HENDERSON ET AL     3,487,365
COMPARING CIRCUIT

Filed Aug. 8, 1966     2 Sheets-Sheet 1

INVENTORS
ROBERT M. HENDERSON,
and
RICHARD ZECHLIN
BY Petherbridge, O'Neill & Aubel
ATTORNEYS INVENTORS
ROBERT M. HENDERSON,
RICHARD ZECHLIN
BY
Petherbridge, O'Neill & Aubel
ATTORNEYS United States Patent Office 3,487,365
Patented Dec. 30, 1969

1

3,487,365
COMPARING CIRCUIT
Robert M. Henderson, Williams Bay, and Richard Zechlin, Beloit, Wis., assignors to Fairbanks Morse Inc., New York, N.Y., a corporation of Delaware
Filed Aug. 8, 1966, Ser. No. 571,116
Int. Cl. G08c 13/00
U.S. Cl. 340—146.2                4 Claims

ABSTRACT OF THE DISCLOSURE

A comparing circuit is disclosed which receives and evaluates the magnitude of received signals The signal representative of the maximum or highest number received during a given period is registered and all signals representative of numbers less than the maximum number received during that period are rejected.

---

The present invention relates to a comparing and storing circuit for receiving and storing the maximum or highest numerical factor coupled thereto.

In various operations, it is desirable to receive and store the maximum numerical factor coupled to the circuit during a given operation. For example, in loading the cargo space of an airplane with a variety of articles, it is desirable for purposes of efficient loading to know the maximum height, width and length measurements of each article.

Further, present shipment charges or rates are determined either on a weight or volume basis. Accordingly, one determination which can be made by the system of the invention is whether the transportation charges are to be on weight or on a volume basis. This latter determination is made on the basis of a selected reference standard, or so-called equivalent weight, obtained by multiplying the volume by a given constant. Thus, to determine the basis of the shipment charges, the equivalent weight may be compared against the actual weight of the article. In present practice, if the actual weight is equal to or greater than the equivalent weight, the transportation charges are on a weight basis; if the actual weight is less than the equivalent weight, the transportation charges are on a volume basis.

Accordingly, it is a principal object of the present invention to provide an improved means of receiving and storing a selected number.

It is another object of the present invention to provide an improved means of storing the maximum numerical factor being received.

It is still another object of the present invention to provide an improved circuit for storing the maximum number being received and rejecting any number of lesser magnitude.

It is still a further object of the present invention to provide an improved circuit for storing a maximum number coupled thereto and providing a hold-out means for inhibiting any other numbers being coupled to the circuit from affecting the stored number.

Figure 1:
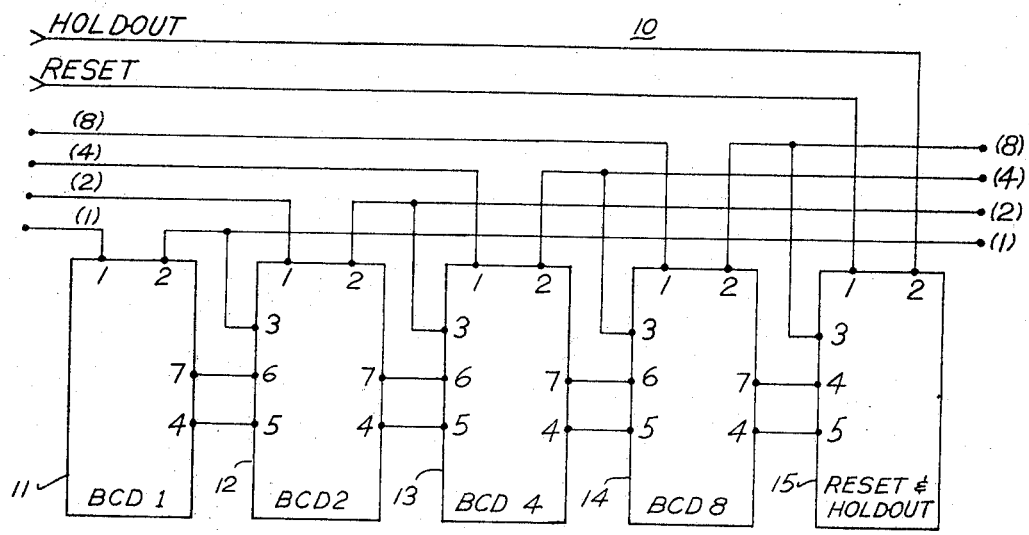

The foregoing and other objects, features and advantages of the invention will be apparent from the following more particular description of preferred embodiments of the invention as illustrated in the accompanying drawings wherein:

FIG. 1 is a block diagram of an apparatus or system in accordance with the invention;

2

Figure 3:
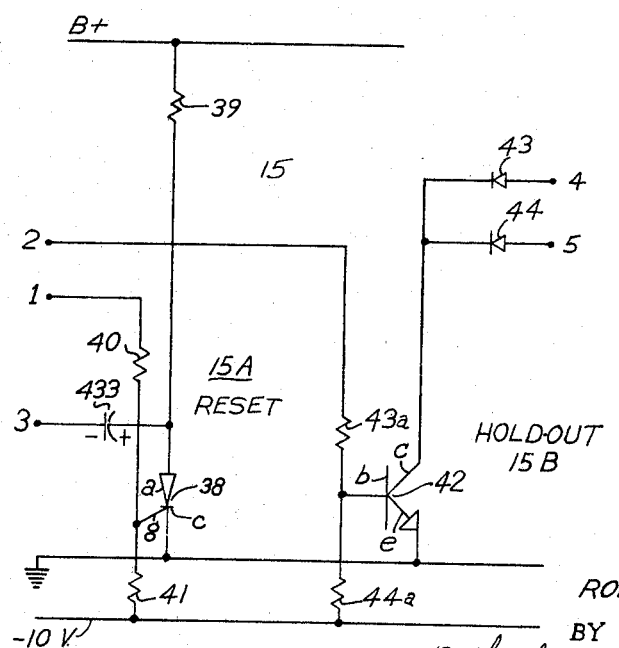
Figure 2:
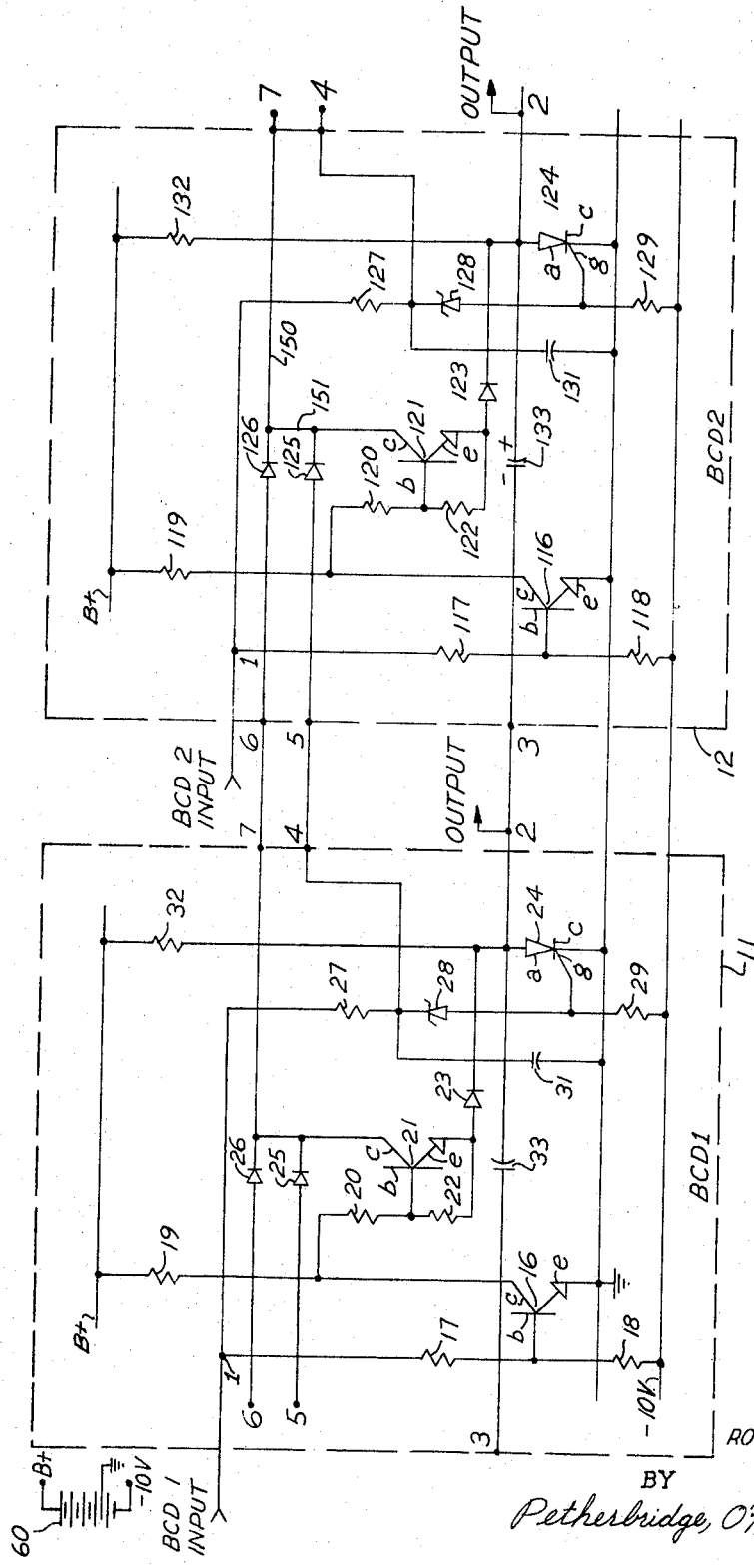

FIG. 2 is a schematic diagram showing circuit details of blocks 11–12 of FIG. 1; and FIG. 3 is a schematic diagram showing circuit details of block 15 of FIG. 1.

The purpose and function of the maximizer is to receive and store a signal representative of the maximum or highest number received during a given period of time. For example, assume the number 4 is received, then if the number 3 is received, the number 3 will not be stored; that is, it will be rejected. However, if, subsequently, the number 5 is received, the number 5 will be registered and stored and the number 4 will be deleted.

FIG. 1 shows a block diagram of the maximizer arranged to process a binary coded decimal or BCD code. FIG. 1 shows a circuit block for each of the BCD bits 1, 2, 4 and 8, comprising blocks 11, 12, 13, 14, respectively, and a Reset and Hold-Out block 15. All of the blocks 11–14 are similar and the circuit details of the blocks 11 and 12 which are representative of blocks 11–14 are shown in FIG. 2.

The connection points between each of the blocks are indicated by the number shown in each of the blocks. For example, the connection point labeled 4 in BCD 1 block number 11 is connected to connection point labeled 5 in the BCD 2 block number 12. The labeled connection points in FIG. 2 correspond to the connection points shown in block diagram in FIG. 1.

In FIG. 1, block number 15 labeled Reset and Hold-Out has two functions. The portion of the block labeled Reset and numbered 15A, see FIG. 3, is provided in the circuit for purposes of resetting the circuit to its initial condition before a succeeding operation is initated. The portion of the circuit labeled Hold-Out and numbered 15B functions to inhibit the maximizer circuit from storing any number during the period the Hold-Out circuit is energized. For example, if the maximizer has the number 4 stored therein, and the Hold-Out circuit 15B is next actuated, any other numbers being coupled to the maximizer while the Hold-Out circuit is energized will not affect the number 4 stored in the maximizer circuit.

To obtain proper operation of the circuit of FIG. 1, the maximizer circuit 10 is arranged to have the blocks 11, 12, 13 and 14 for receiving the BCD code bits 1, 2, 4 and 8 positioned in that order. As mentioned, each of the four blocks 11, 12, 13 and 14 are similar, hence the circuit details of the maximizer are shown in FIG. 2 which represent blocks 11 and 12 of FIG. 1. Note that the two blocks shown in FIG. 2 are similar to each other. Hence, for purposes of this description, the structure of block 11 which receives a BCD 1 input will be described in detail, and the structure of block 12 will be described only as required to describe the operation thereof.

Block 11 (FIG. 2) comprises a first transistor 16 having its emitter $e$ connected to ground, and its base $b$ connected through a resistor 17 to the lead or input labeled BCD 1 Input. The base $b$ of transistor 16 is also connected through resistor 18 to the −10 volt line. The collector $c$ of transistor 16 is connected through a load resistor 19 to the B+ line connected to any suitable source of potential indicated as a battery 60. The collector $c$ of transistor 16 is further connected through a resistor 20 to the base $b$ of transister 21. The base $b$ of transistor 21 is also connected through resistor 22 to the emitter $e$ of transistor 21. The emitter $e$ of transistor 21 is further connected to the anode of a diode 23 whose cathode is connected to the anode $a$ of a silicon controlled rectifier or SCR 24.

The other circuit connections of SCR 24 will be described hereinafter.

The collector c of transistor 21 is connected to the cathode of a diode 25 whose anode is connected to connection point 5. Connection point 5 is not connected in block 11; note, however, that connection point 5 is connected in each of blocks 12, 13 and 14 to the preceding block, see FIG. 1. The collectors c of transistor 21 is also connected to the cathode of another diode 26 whose anode is connected to connection point 6. As is the case with connection point 5, connection point 6 is not connected in block 11 but is connected in each of the blocks 12, 13 and 14 to the preceding block. The common connection of the cathodes of diodes 26 and 25, and hence the collector c of transistor 21, is connected through connection point 7 of block 11 to connection point 6 of the succeeding block, see FIG. 1.

A BCD 1 Input line is connected through a resistor 27 to the cathode of a Zener diode 28 whose anode is connected through a resistor 29 to the −10 volt line. The junction of resistor 27 and the cathode of Zener diode 28 is connected through a capacitor 31 to ground potential.

The SCR 24, previously mentioned, includes an anode a, a cathode c and a gate g. The cathode c of SCR 24 is connected to ground, the gate g is connected to the junction of Zener diode 28 and resistor 29, and its anode a is connected through a load resistor 32 to the B+ potential line. The anode of SCR 24 is also connected through capacitor 33 to connection point 3. Note that the anode of SCR 24 of block 11 is connected through connection point 2 to connection point 3 of the succeeding block 12. In the case of block 11, connection point 3 is not connected in the circuit; however, the connection point 3 of each of the succeeding blocks 12, 13 and 14 is connected to connection point 2 of the preceding block. An output bit or signal is provided at connection point 2 of each of blocks 11, 12, 13 and 14. Connection point 2 being at low potential indicates the presence of an output bit.

The BCD block 12 is essentially the same as BCD block 11 and the elments in block 12 corresponding to the elements in block 11 are numbered to have the same last two digits; for example, transistor 116 in BCD block 12 corresponds to transistor 16 in BCD block 11.

The circuit of the invention can be coupled to any circuit having a BCD output such as, for example, the circuit shown in FIG. 18 of the application of R.M. Henderson, L. E. Miller and R. Zechlin Ser. No. 511,112 filed on August 8, 1966, entitled measuring system and assigned to the same assignee as the present invention.

In operation, assume that the block 11 receives a positive input signal representative of a BCD 1 input. A positive signal representative of a BCD 1 input will cause Zener diode 28 to break down and conduct and provide a gate-to-cathode current in SCR 24 which will cause SCR 24 to turn ON. When SCR 24 turns ON, its anode will be at a low potential (essentially ground); this low potential is coupled to connection point 2 as an output indicating the presence of a BCD 1 input. At this point a 1 is stored in BCD block 11. Once SCR 24 turns ON, even though the BCD 1 input is turned OFF, SCR 24 will continue to be in a saturated or conducting condition and will continue to store a BCD 1 at output connection point 2. Note that the BCD 1 input signal is also coupled through resistor 17 to the base b of transistor 16. Such signal biases transistor 16 to an ON condition which will place the collector c of transistor 16 at a low potential (essentially ground potential) and this will cause transistor 21 to be turned OFF.

When SCR 24 in block 11 is turned ON, capacitor 133 in BCD block 12 will charge through a circuit path that may be traced from the B+ line of block 12, through resistor 132, capacitor 133 and the conducting SCR 24 to ground. Thus, capacitor 133 will be charged to have a positive potential on its right-hand plate, as oriented in FIG. 2.

Next, assume a positive signal corresponding to a BCD 2 input is coupled to the connection point 1 in BCD block 12. Such a positive signal will cause SCR 124 to turn ON and provide an output signal on connection point 2 of block 12 indicative of a BCD 2 input.

When SCR 124 turns ON the capacitor 133, previously charged to have a positive potential on its right-hand plate, will now discharge through a path which may be traced from the right-hand plate of capacitor 133 through the anode a to cathode c circuit of SCR 124, and in a relatively reversed direction through the cathode c to anode a circuit of SCR 24 and will tend to reduce the current flow in SCR 24 and cause SCR 24 to turn OFF.

In this latter condition, a BCD 2 output will be stored in block 12, and the BCD 1 previously stored in block 11 will be canceled.

Now assume that the next input signal to the circuit of FIG. 1 is a signal representative of BCD 1 input. This signal is connected to connection point 1 of block 11. However, since SCR 124 of block 12 has a BCD 2 stored therein (SCR 124 is ON or conducting) a current flow path will be established from the B+ line of block 12 through resistors 119, 120 and 122, diode 123 and SCR 124 to ground. This current will forward bias transistor 121 to conduct and the collector c of transistor 121 will drop to a low potential which is coupled to the cathodes of diodes 125 and 126. This low potential at the cathode of diode 125 is coupled through connection point 5 of block 12 to connection point 4 of block 11 and to the junction of resistor 27 and Zener diode 28 of block 11. Accordingly, the BCD 1 input signal to connection point 1 of block 11 is shunted from resistor 27 through diode 125, transistor 121 through diode 123, and the conducting SCR 124 to ground. Hence, a BCD 1 signal applied after a BCD 2 signal is applied will not cause SCR 24 to conduct. Thus, the BCD 1 input signal will be rejected; i.e., will not be stored.

Assume now a BCD 3 input is connected into the circuit of FIG. 1. As is known, a BCD 3 input consists of BCD 1 + BCD 2 input signals. Thus assume BCD 1 and BCD 2 signals are concurrently coupled to blocks 11 and 12, respectively. Since a BCD 2 is already stored in block 12, the application of a BCD 2 signal to block 12 will not cause any change in operating condition of SCR 124. However, note that the BCD 2 input signal is also coupled from connection point 1 of block 12, through resistor 117 to the base b of transistor 116 to cause transistor 116 to turn ON. Accordingly, essentially ground potential will be placed at the junction of resistors 119 and 120. The current flowing through the path previously established from the B+ line of block 12 through resistors 119, 120 and 122, diode 123 and SCR 124 will now be shunted to ground through transistor 116. The interruption of the current flowing through resistors 120 and 122 will cause transistor 121 to turn OFF. The collector c of transistor 121 will now remove the ground or low potential from the cathode of diode 125. Accordingly, the junction of resistor 27 and Zener diode 28 will no longer be at a low potential, and BCD 1 input, coupled to block 11, will now be effective through resistor 27 and Zener diode 28 to cause SCR 24 to conduct and store a BCD 1. At this point, a BCD 1 and a BCD 2; that is, a BCD 3 will be stored in the system.

The function and purpose of each of the diodes in blocks 12, 13 and 14, corresponding to diode 26 in block 11, is to couple a low potential effective at its cathode to a preceding block. For example, if a BCD 4 is stored in block 13, then the diode in BCD block 13 corresponding to diode 26 will couple a low potential through connection point 6 of BCD block 13 to connection point 7 of BCD block 12, lines 150 and 151 in block 12 through the diode 125 in block 12, connection point 5 of block 12, connection point 4 of block 11 to the junction of the resistor 27 and Zener diode 28 in block 11. Thus, the foregoing current path functions to couple the low potential at the cathodes of the diodes in blocks 13 and 14 corresponding to diodes 26 and 126 in blocks 11 and 12 to the blocks or stages preceding.

The details of the Reset and Hold-Out circuit 15 of FIG. 1 are shown in FIG. 3. The circuit of FIG. 3 includes a Reset portion numbered 15A and labeled "Reset," and a Hold-Out portion number 15B and labeled "Hold-Out." The Reset portion 15A comprises an SCR 38 having an anode *a*, a cathode *c* and a gate *g*. The anode *a* of SCR 38 is connected through resistor 39 to the B+ line; its cathode *c* is connected to ground, and its gate *g* is connected through a resistor 40 to input connection point 1. The anode *a* of SCR 38 is also connected through a capacitor 433 to input connection point 3. The gate *g* of SCR 38 is also connected through a resistor 41 to the —10 volt line.

The Hold-Out portion of the circuit of FIG. 3 includes an NPN transistor 42 having a base *b*, an emitter *e* and collector *c*. The base *b* of transistor 42 is connected through resistor 43a to input connection point 2. The base *b* of transistor 42 is also connected through resistor 44a to the —10 volt line, and collector *c* of transistor 42 is connected in common to the cathodes of diodes 43 and 44. The anode of diode 43 is connected through connection point 4 of block 15 to connection point 7 of the BCD 8 block 14, see FIG. 1, and the anode of diode 44 is connected through connection point 5 of block 15 to connection point 4 of the BCD 8 block 14.

In operation, when it is desired to reset the maximizer circuit to clear all numbers out of the maximizer of FIG. 1 and return it to a zero condition so that the maximizer can initiate a succeeding operation, a positive Reset signal is coupled from a suitable control source, not shown, through connection point 1, see both FIGS. 1 and 3, to resistor 40 to the gate electrode of SCR 38.

If the BCD 8 block 14 is conducting, capacitor 433 connected to the anode of SCR 38 will be charged through the conducting SCR of block 14 corresponding to SCR 124 in block 12, to have a positive potential on its right-hand plate, as oriented in FIG. 3. When the Reset signal turns SCR 38 ON, capacitor 433 will discharge through SCR 38 and the conducting SCR of BCD 8 block 14 as explained hereinabove.

If a bit is stored in any of the other BCD blocks 11–13, when SCR 38 turns ON, capacitor 433 will act as a coupling capacitor to permit any of the charged capacitors in BCD blocks 11, 12 and/or 13 to discharge through a path including capacitor 433, the conducting SCR 38 and in a relatively reverse direction through the conducting SCR or SCRs in blocks 11–13, in the manner previously explained to turn OFF all the conducting SCRs.

It should be appreciated that capacitor 33 and all the other capacitors in blocks 12, 13 and 14 corresponding to capacitor 33 are connected to operate in essentially the same manner as capacitor 433. More specifically, and as an example, assume block 11 has a BCD 1 stored therein and capacitor 133 in block 12 is charged as explained above. Next, a BCD 8 is stored in block 14, the capacitor in block 13 corresponding to capacitor 33 will act as a coupling capacitor to permit charged capacitor 133 of block 12 to discharge therethrough and through the SCR in block 14, and in a relatively reverse direction through SCR 24 in block 11.

The operation and function of the Hold-Out circuit of FIG. 3 is to prevent any number coupled to the circuit after the Hold-Out circuit is energized from affecting the number stored in the circuit while the Hold-Out signal is applied thereto. In operation, transistor 42 is normally OFF, and a positive Hold-Out signal coupled to connection point 2 will cause transistor 42 to conduct. Ground potential is effectively coupled through conducting transistor 42 to the cathodes of diodes 43 and 44 and thence to connection points 4 and 5, respectively, to connection points 7 and 4 of the BCD 8 of block 14. Accordingly, and as described above, a zero potential is coupled to the junction of the resistor and Zener diode in block 14 corresponding to resistor 27 and Zener diode 28 in block 11 to prevent any signal applied through the input for BCD 8 block 14 from affecting the operation of the SCR in that block. Likewise, a zero potential will be coupled through connection point 7 to the other blocks 11, 12 and 13 through the circuits of diodes 26 and 25 previously traced to provide a zero potential at the junction of resistors 27 and Zener diode 28 in block 11 and the corresponding resistors and Zener diodes in blocks 11, 13 and 14 to prevent any signal coupling to that particular block from affecting or changing the state of the respective SCR.

As will be readily appreciated, the circuit of FIG. 1 may be expanded to include a larger number of blocks to process codes having a larger number of inputs. Numbers having more than one digit could also be processed to obtain the storage of a maximum number coupled thereto by combining or connecting two or more circuits of FIG. 1 in selected order positions. In such combination the highest digit in position is one numerical increment higher than the maximum number combination of lesser digits. For example, two such circuit assemblies as shown in FIG. 1 might be combined as follows:

| TENS | | | | UNITS | | | |
|---|---|---|---|---|---|---|---|
| 1 | 2 | 4 | 8 | 1 | 2 | 4 | 8 |

The digit 1 in the Tens group is arranged to be numerically higher than any combination of digits in the units. Accordingly the number as high as 99 could be processed, in this example.

While the invention has been particularly shown and described with reference to preferred embodiments thereof, it will be understood by those skilled in the art that various changes in form and details may be made therein without departing from the spirit and scope of the invention.

We claim:
1. A comparing circuit comprising, in combination:
 (a) a plurality of registers arranged to receive signals representing factors of various magnitudes;
 (b) each of said registers including a silicon controlled rectifier;
 (c) means for rendering a silicon controlled rectifier conductive in response to a signal coupled to the respective register and said rectifier, when conducting, representing a signal stored in said register;
 (d) capacitor means electrically connecting silicon controlled rectifiers in electrically adjacent registers, said capacitor means being caused to charge in response to the conduction of a silicon controlled rectifier in a preceding register, and said capacitor means being caused to discharge when the associated silicon controlled rectifier is caused to conduct in response to the entry of a signal therein, and said capacitor discharge being in a relatively reverse direction through the silicon controlled rectifiers in the preceding registers to thereby turn OFF said silicon controlled rectifiers in said preceding registers.
2. A circuit as in claim 1 further including:
 (a) inhibiting means for connecting a potential from a conducting silicon controlled rectifier to a preceding register to thereby render said preceding register non-responsive to a signal applied thereto.
3. A circuit as in claim 2 further including:
 (a) means for coupling a signal representative of numerical values concurrently to two or more of said registers; and

(b) means for selectively rendering said inhibiting means ineffective when simultaneous signals are applied to said registers whereby a given register and a preceding register can concurrently enter and store signals representative of a numerical value therein.

4. A circuit as in claim 2 wherein said inhibiting means connect a low potential to all of the preceding registers to shunt to ground the signals applied to said preceding registers.

References Cited

UNITED STATES PATENTS 3,187,303   6/1965   Chiapuzio et al. ----- 340—146.2

EUGENE G. BOTZ, Primary Examiner

U.S. Cl. X.R.

320—1

UNITED STATES PATENT OFFICE
CERTIFICATE OF CORRECTION

Patent No. 3,487,365  December 30, 1969

Robert M. Henderson et al.

It is certified that error appears in the above identified patent and that said Letters Patent are hereby corrected as shown below:

Column 1, line 13, "signals" should read -- signals. --; line 3 after "on" insert -- a --. Column 3, line 49, "511,112" should read -- 571,112 --.

Signed and sealed this 23rd day of February 1971.

(SEAL)
Attest:

Edward M. Fletcher, Jr.
Attesting Officer

WILLIAM E. SCHUYLER, JR.
Commissioner of Patents